United States Patent
Wei et al.

(10) Patent No.: US 7,648,566 B2
(45) Date of Patent: Jan. 19, 2010

(54) METHODS AND APPARATUS FOR CARBON DIOXIDE REMOVAL FROM A FLUID STREAM

(75) Inventors: Wei Wei, Mission Viejo, CA (US); James Anthony Ruud, Delmar, NY (US); Anthony Yu-Chung Ku, Rexford, NY (US); Vidya Ramaswamy, Niskayuna, NY (US); Ke Liu, Rancho Santa Margrita, CA (US)

(73) Assignee: General Electric Company, Niskayuna, NY (US)

( * ) Notice: Subject to any disclaimer, the term of this patent is extended or adjusted under 35 U.S.C. 154(b) by 434 days.

(21) Appl. No.: 11/558,063

(22) Filed: Nov. 9, 2006

(65) Prior Publication Data
US 2008/0112867 A1    May 15, 2008

(51) Int. Cl.
B01D 53/22 (2006.01)
B01D 53/62 (2006.01)
B01J 19/24 (2006.01)
C01B 3/50 (2006.01)

(52) U.S. Cl. ........................ 96/9; 96/4; 96/10; 96/11; 95/51; 422/187; 422/189; 422/190; 422/195; 422/211; 422/247; 48/DIG. 5

(58) Field of Classification Search ............... 96/4, 96/7, 9, 10, 11; 95/45, 51; 422/187, 189, 422/190, 195, 198, 211, 236; 423/220, 246, 423/247; 48/198.2, 198.7, DIG. 5
See application file for complete search history.

(56) References Cited

U.S. PATENT DOCUMENTS

| | | | |
|---|---|---|---|
| 4,238,468 A * | 12/1980 | Bonacci et al. | ............. 423/359 |
| 5,441,990 A | 8/1995 | Robin et al. | |
| 5,507,860 A | 4/1996 | Rao et al. | |
| 5,637,259 A | 6/1997 | Galuszka et al. | |
| 5,645,891 A | 7/1997 | Liu et al. | |
| 5,772,735 A | 6/1998 | Sehgal et al. | |
| 5,827,569 A | 10/1998 | Akiyama et al. | |
| 5,935,533 A | 8/1999 | Kleefisch et al. | |
| 6,024,774 A * | 2/2000 | Nakagawa et al. | ............. 95/51 |
| 6,033,632 A | 3/2000 | Schwartz et al. | |
| 6,048,472 A | 4/2000 | Nataraj et al. | |

(Continued)

FOREIGN PATENT DOCUMENTS

EP    0867404    9/1998

(Continued)

OTHER PUBLICATIONS

EP Search Report, EP 07115495, Mar. 12, 2008.

(Continued)

Primary Examiner—Jason M Greene
(74) Attorney, Agent, or Firm—Francis T. Coppa

(57) ABSTRACT

An apparatus for producing hydrogen gas wherein the apparatus includes a reactor. In one embodiment, the reactor includes at least two conversion-removal portions. Each conversion-removal portion comprises a catalyst section configured to convert CO in the stream to $CO_2$ and a membrane section located downstream of and in flow communication with the catalyst section. The membrane section is configured to selectively remove the $CO_2$ from the stream and to be in flow communication with a sweep gas.

15 Claims, 3 Drawing Sheets

U.S. PATENT DOCUMENTS

| | | | |
|---|---|---|---|
| 6,077,323 | A | 6/2000 | Nataraj et al. |
| 6,090,312 | A | 7/2000 | Ziaka et al. |
| 6,114,400 | A | 9/2000 | Nataraj et al. |
| 6,129,861 | A | 10/2000 | Meusinger et al. |
| 6,228,147 | B1 | 5/2001 | Takahashi |
| 6,237,339 | B1 | 5/2001 | Asen et al. |
| 6,419,726 | B1 * | 7/2002 | Frost et al. ............... 96/9 |
| 6,579,331 | B1 * | 6/2003 | Ho ........................ 95/51 |
| 6,592,641 | B2 | 7/2003 | Alvin et al. |
| 6,655,150 | B1 | 12/2003 | Asen et al. |
| 6,667,022 | B2 | 12/2003 | Cole |
| 6,669,917 | B2 | 12/2003 | Lyon |
| 6,881,394 | B2 * | 4/2005 | Keller ................... 422/190 |
| 6,911,057 | B2 | 6/2005 | Lyon |
| 7,011,694 | B1 * | 3/2006 | Ho ........................ 95/51 |
| 2002/0034818 | A1 | 3/2002 | Schillig et al. |
| 2003/0222015 | A1 | 12/2003 | Oyama et al. |
| 2004/0061094 | A1 | 4/2004 | Lyon |
| 2004/0076874 | A1 | 4/2004 | Nickel et al. |
| 2004/0141910 | A1 | 7/2004 | Vizoso |
| 2004/0224396 | A1 | 11/2004 | Maston |
| 2004/0237406 | A1 | 12/2004 | Fuder |
| 2005/0036940 | A1 | 2/2005 | Grace et al. |
| 2005/0172556 | A1 | 8/2005 | Powell et al. |
| 2005/0172811 | A1 | 8/2005 | Oyama et al. |
| 2005/0210881 | A1 | 9/2005 | Balan et al. |
| 2006/0172161 | A1 * | 8/2006 | Ueda et al. ............... 429/20 |
| 2007/0110649 | A1 * | 5/2007 | Kusakabe et al. ......... 423/210 |
| 2007/0130832 | A1 * | 6/2007 | Liu et al. .............. 48/198.7 |
| 2008/0179569 | A1 * | 7/2008 | Clomburg et al. .......... 422/187 |

FOREIGN PATENT DOCUMENTS

| | | |
|---|---|---|
| EP | 1364910 | 11/2003 |
| WO | 99/06138 A1 | 2/1999 |
| WO | 0048709 | 8/2000 |
| WO | 02/092500 A1 | 11/2002 |
| WO | 03/080229 A1 | 10/2003 |
| WO | 00/33942 A1 | 11/2006 |

OTHER PUBLICATIONS

M. Bracht et al., "Water gas shift membrane reactor for CO2 control in IGCC systems: techno-economic feasibility study," Energy Conversion and Management, Elsevier Science Publishers, vol. 38, No. 1001, ISSN: 0196-8904, 1997, pp. S159-S164.

Bredesen et al., "High-Temperature Membranes in Power Generation with CO2 Capture", Chemical Engineering and Processing 43, pp. 1129-1158 (2004), Received Feb. 24, 2003.

International Publication No. WO02092500, Publication Date Nov. 21, 2002, Abstract Only, 1 page.

International Publication No. WO03080229, Publication Date Oct. 2, 2003, Abstract Only, 1 page.

Horiuchi et al; "An Estimate of Surface Mobility of CO2 on y-Alumina and MgO-Modified y-Alumina Above 500 K"; Journal of Colloid and Interface Science; 204; pp. 217-218; (1998).

Shen et al; "CO2 Adsorption Over Si-MCM-41 Materials Having Basic Sites Created by Postmodification with La2O3"; Langmuir; 20; pp. 9130-9137; (2004) Abstract and Full Article.

Rao, et al; "Performance and Pore Characterization of Nanoporous Carbon Membranes for Gas Separation"; Journal of Membrane Science; 110; pp. 109-118; (1996).

Moon et al; "Separation Characteristics of Tetrapropylammoniumbromide Templating Silica/Alumina Composite Membrane in CO2/N2, CO2/H2 and CH4/H2 Systems"; Korean J. Chem. Eng.; 21; pp. 477-487; (2004).

Cho et al; "Separation of CO2 by Modified y-Al2O3 Membranes at High Temperature"; Journal of Membrane Science; 104; pp. 219-230; (1995).

Kusakabe et al; "Separation of CO2 with BaTiO3 Membrane Prepared by the Sol-Gel Method"; Journal of Membrane Science; 95; pp. 171-177; (1994).

Shih et al; "Development of Mesoporous Membrane Materials for CO2 Separation"; Drexel University, Department of Materials Engineering, Drexel University, Philadelphia, PA 19104; Grant No. DE-FG2600-NT40823; Performance period: Jan. 1, 2001-Dec. 31, 2001; Abstract; 2 pages.

* cited by examiner

METHODS AND APPARATUS FOR CARBON DIOXIDE REMOVAL FROM A FLUID STREAM

STATEMENT REGARDING FEDERALLY SPONSORED RESEARCH & DEVELOPMENT

This invention was made with Government support under contract number DOE NETL DE-FC26-05NT42451 awarded by the U.S. Department of Energy. The Government may have certain rights in the invention.

BACKGROUND

This application relates generally to gas separation processes and apparatus, and more particularly, to $CO_2$ sequestration.

The application of syngas conversion and purification, e.g., after the syngas is generated from coal gasification processes, can be used for integrated gasification combined cycle (IGCC) power plants for electricity production from coal, and IGCC-based polygeneration plants that produce multiple products such as hydrogen and electricity from coal, and is useful for plants that include carbon dioxide separation. It is also applicable to purification of other hydrocarbon-derived syngas which can be used for electricity production or polygeneration, including syngas derived from natural gas, heavy oil, biomass and other sulfur-containing heavy carbon fuels.

The commercialization of known 'coal-to-hydrogen ($H_2$) and electricity' technologies (coal gasification-based polygeneration plants or IGCC power plants) has been hampered by the high capital costs associated with removing the impurities. The stringent purity requirements for hydrogen fuel and the fuel specifications for the gas turbine are generally satisfied using a series of clean-up unit operations, which facilitate carbon monoxide (CO) conversion, sulfur removal, carbon dioxide ($CO_2$) removal, and final gas polishing. Some known syngas clean-up technologies focus on removing each impurity in a separate unit operation.

Raw fuel gas exiting the gasifier is cooled and cleaned of particulate before being routed to a water-gas-shift (WGS) reaction unit, which converts CO and $H_2O$ present in the syngas to $CO_2$ and $H_2$, thereby concentrating it in the high-pressure raw syngas stream. Also, in order to attain the desired CO conversion, highly excessive amounts of steam are generally introduced to the syngas stream in order to drive the WGS reaction to near completion. As a result, the WGS reaction demands large amount of energy to generate the excessive amount of steam that the reaction requires. The resulting syngas contains primarily $H_2$, which is the desired product, and $CO_2$ and other impurities (such as sulfur) that are to be removed prior to utilization of the $H_2$.

Sequestration of $CO_2$ from power plants and other commercial plants that generate large amounts of $CO_2$ is desirable. Among existing types of $CO_2$ capture technologies, the pre-combustion $CO_2$ capture technologies, which remove $CO_2$ from concentrated syngas stream at high pressure prior to combustion of the fuel, is usually more efficient and cost-effective for coal-gasification based power plant or $H_2$ production plants than post-combustion $CO_2$ capture technologies, which capture $CO_2$ from low pressure exhaust stream that is diluted with nitrogen and oxygen after the combustion of the fuel. The cost of pre-combustion $CO_2$ capture using commercially available technologies such as absorbent based technologies can be as high as $40/ton, which, although is much lower than the cost of post-combustion capture, is still much too high for carbon emissions reduction applications. Furthermore, carbon dioxide capture is generally estimated to represent three-fourths of the total cost of a carbon capture, storage, transport, and sequestration system.

Hence, there continues to be a need for highly efficient and simplified CO conversion and $CO_2$ removal systems that reduce or eliminate other system components, increase system efficiency, and/or otherwise simplify the purification of a $H_2$ stream.

BRIEF DESCRIPTION

Disclosed herein are embodiments of apparatus for selective gas removal and hydrogen generation, and methods and systems for using the same.

In one embodiment, an apparatus for producing hydrogen gas can comprise: a housing, a first conversion-removal portion located in the housing, near the inlet, and configured to receive a fluid stream from the inlet, and a second conversion-removal portion located in the housing and downstream of the first conversion-removal portion and configured to receive the stream from the first conversion-removal portion. The housing has an inlet near an upstream end and an outlet near a downstream end. The first conversion-removal portion comprises a first catalyst section configured to convert CO in the stream to $CO_2$, and a first membrane section located downstream of and in flow communication with the first catalyst section. The second conversion-removal comprises a second catalyst section configured to convert CO in the stream to $CO_2$ and a second membrane section located downstream of and in flow communication with the second catalyst section. The second membrane section is configured to selectively remove the $CO_2$ from the stream and to be in flow communication with a second sweep gas.

In another embodiment, an apparatus for producing hydrogen gas can comprise: a housing having an inlet near an upstream end and an outlet near a downstream end, a first conversion-removal portion, a second conversion-removal portion, and a third conversion-removal portion. The first conversion-removal portion is located in the housing, near the inlet, and configured to receive a fluid stream from the inlet. The first conversion-removal portion comprises a first catalyst section configured to convert CO in the stream to $CO_2$ and a first membrane section located downstream of and in flow communication with the first catalyst section. The first membrane section is configured to selectively remove the $CO_2$ from the stream and to be in flow communication with a first sweep gas. The second conversion-removal portion is located in the housing and downstream of the first conversion-removal portion. The second conversion-removal portion is configured to receive the stream from the first conversion-removal portion. The second conversion-removal portion comprises a second catalyst section configured to convert CO in the stream to $CO_2$ and a second membrane section located downstream of and in flow communication with the second catalyst section. The second membrane section is configured to selectively remove the $CO_2$ from the stream and to be in flow communication with a second sweep gas. The third conversion-removal portion located in the housing and downstream of the second conversion-removal portion. The third conversion-removal portion is configured to receive the stream from the second conversion-removal portion. The third conversion-removal portion comprises a third catalyst section configured to convert CO in the stream to $CO_2$ and a third membrane section located downstream of and in flow communication with the third catalyst section. The third membrane section is configured to selectively remove the $CO_2$ from the stream and to be in flow communication with a third sweep gas. The housing has a decreasing diameter such that a first diameter at the first conversion-removal portion is greater than a third diameter near the third conversion-removal portion.

In one embodiment, a method for removing $CO_2$ from a fluid stream comprises: converting CO in the fluid stream to $CO_2$ to form a first $CO_2$ stream, changing a first reaction equilibrium in the first $CO_2$ stream to increase a driving force toward the conversion of CO to $CO_2$, converting additional CO in the first $CO_2$ stream to $CO_2$ to form a second $CO_2$ stream, changing a second reaction equilibrium in the second $CO_2$ stream to increase a driving force toward the conversion of CO to $CO_2$, and removing the $CO_2$ from the second $CO_2$ stream to produce a $H_2$ stream. The first reaction equilibrium is changed without the introduction of additional reactants to the first $CO_2$ stream, and the second reaction equilibrium is changed without the introduction of additional reactants to the second $CO_2$ stream.

The above described and other features are exemplified by the following figures and detailed description.

BRIEF DESCRIPTION OF THE DRAWINGS

Refer now to the figures, which are exemplary, not limiting, and wherein like numbers are numbered alike.

DETAILED DESCRIPTION OF THE INVENTION

Figure 1:
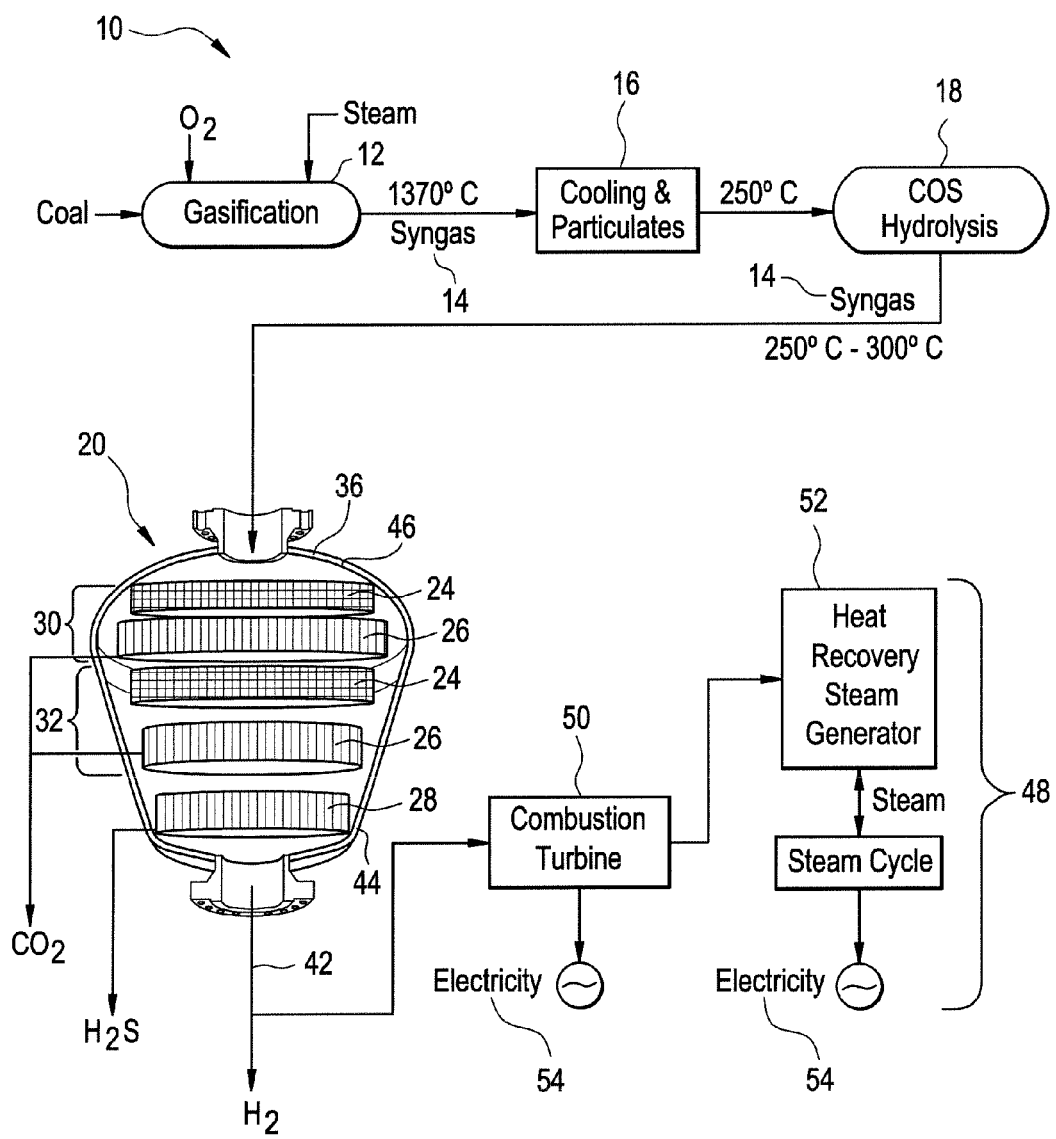
FIG. 1 is a schematic view of an exemplary integrated gasification combined cycle (IGCC) polygeneration plant including an integrated syngas clean-up section.

Purification of a hydrogen stream, and, in particular, the conversion of carbon monoxide to carbon dioxide, and the removal of the carbon dioxide, can be expensive and inefficient. An apparatus that has multiple conversion-removal portions (wherein each portion converts carbon monoxide (CO) to carbon dioxide ($CO_2$) and then removes the carbon dioxide from the stream), can reduce the footprint of this section of a power plant. By having multiple carbon dioxide removal sections (e.g., membrane sections), the integrated syngas cleanup section attains simplified conversion of carbon monoxide and water to carbon dioxide and hydrogen. Previously, highly excessive amounts of steam (i.e., greater than 230% of the stoichiometric amount) were introduced to the stream to drive the reaction to completion, that is, to convert nearly all of the carbon monoxide in the stream. As used herein, the stoichiometric amount of steam is the amount of steam that would actually be consumed if all the carbon monoxide in the stream were converted to produce carbon dioxide and hydrogen. Generating such excessive amount of steam at the same pressure as the syngas stream consumes great amount of energy and thus reduces the overall thermal efficiency of the plant. A condenser would also be needed downstream of the reactor to remove the excess water in the purified hydrogen ($H_2$) stream.

In the apparatus with the multiple conversion-removal portions, carbon monoxide and steam are converted to carbon dioxide and hydrogen in each of the conversion section, which is followed by a removal section where carbon dioxide is then removed from the stream, thereby enhancing the reaction driving force toward additional carbon monoxide conversion in the subsequent conversion sections. Therefore, the amount of steam introduced to the stream for the near complete conversion of carbon monoxide (e.g., greater than 95%) can be substantially reduced (e.g., to less than or equal to about 150%, more specifically, less than or equal to about 130%, and even to less than or equal to about 110% of the stoichiometric amount of steam). The reduction of the amount of steam required for this process directly results in the reduction of the amount of energy required for such process.

Additionally, the apparatus can be the same size or smaller than a integrated single stage conversion-removal reactor that would be required to achieve similar level of carbon monoxide conversion and carbon dioxide removal ratio, and (at the same flow rate, initial hydrogen concentration, and initial carbon monoxide concentration), can attain a higher carbon monoxide conversion efficiency and lower hydrogen loss (e.g., a hydrogen loss of less than or equal to about 8%). As used herein, the percentage of $H_2$ loss is defined as the amount of $H_2$ being removed in the $CO_2$ stream divided by the sum of the amount of $H_2$ in the original syngas stream and the $H_2$ that would be generated if all CO in the original syngas stream were converted to $H_2$.

FIG. 1 is a schematic view of an exemplary integrated gasification combined cycle (IGCC) polygeneration plant 10 for hydrogen gas ($H_2$) and electricity production with carbon dioxide ($CO_2$) separation. Plant 10 includes a gasification unit 12 that receives low value feedstock (LVF) and oxygen containing material and produces a syngas 14.

The LVF includes gasification feedstocks (e.g., that provide a source of hydrogen and carbon for partial oxidation processes), fluid hydrocarbonaceous fuel (e.g., a composition comprising hydrocarbon compound(s) in a fluid, (i.e. gaseous, liquid or fluidized solid state), and solid carbonaceous material, as well as combinations comprising at least one of the foregoing. Fluid hydrocarbonaceous fuels include petroleum products (including distillates and residues, such as crude petroleum, reduced crude, gasoline, naphtha, kerosine, crude petroleum asphalt, gas oil, residual oil, tar sand oil, shale oil, cycle gas oil, oil derived from coal, lignite, aromatic hydrocarbons (such as benzene, toluene, and xylene fractions), coal tar, and furrural extract of coke or gas oil); oxygenated hydrocarbonaceous organic materials (including carbohydrates, cellulosics, aldehydes, organic acids, alcohols, ketones, and oxygenated fuel oil); waste liquid and by-products from chemical processes containing oxygenated hydrocarbonaceous organic materials; gaseous hydrocarbons (including natural gas, refinery offgases or other gas streams containing hydrogen and/or saturated or unsaturated hydrocarbons like methane, ethane, ethene, propane, propene, and so on); waste gases including organic nitrogen, sulfur or oxygen compounds; and other suitable materials, as well as combinations comprising at least one of the foregoing. Another suitable feedstock is solid carbonaceous material, i.e., a composition comprised of one or more solid carbon-containing compounds. Solid carbonaceous material includes coal (such as anthracite, bituminous, subbituminous); coke from coal; lignite, residue derived from coal liquefication; crude residue from petroleum distillation and cracking processes; oil shale; tar sand; petroleum coke; asphalt; pitch; particulate carbon (soot); concentrated sewer sludge: tank and pond bottoms: separator sludge; air flotation solids; and other suitable materials, as well as combinations comprising at least one of the foregoing materials. Some possible feedstock are disclosed in U.S. Pat. No. 5,441,990.

Gasification unit 12 is in flow communication with a series of syngas coolers 16 (configured to remove heat and particulates) and with a carbonyl sulfide (COS) hydrolysis unit 18 that is configured to convert COS to hydrogen sulfide ($H_2S$) in the syngas 14. Syngas 14 is then processed through an integrated syngas clean-up section.

The integrated syngas clean-up section has a reactor 20 comprising a housing 36 disposed around a first conversion-removal portion 30, a second conversion-removal portion 32, and a $H_2S$ membrane 28. Each conversion-removal portion comprises a catalyst section 24 located upstream of a membrane section 26 such that a fluid stream passes through the first catalyst section where carbon monoxide and steam are converted to $H_2$ and $CO_2$, and then the stream passes through the first membrane section where the $CO_2$ is removed from the stream by $CO_2$ selective membranes. The removal of $CO_2$ from the stream increases the concentrations of CO and $H_2O$ in the stream (in relation to the remaining amount of $CO_2$ in the stream), thereby enhancing the driving force toward additional CO conversion. The now $CO_2$ depleted stream then contacts the second catalyst section where more carbon monoxide and in the stream present in the stream are converted to additional $H_2$ and additional $CO_2$. The stream then passes through the second membrane section where additional $CO_2$ is removed from the stream. Sweep gas that passes through the membranes removes the $CO_2$ from the reactor 20. The stream then passes through the $H_2S$ selective membrane section that selectively removes the $H_2S$ from the stream, prior to a $H_2$ rich stream 42 exiting the reactor 20.

The membranes can be sealed from the flow of the syngas stream in any fashion that enables the sweep gas to remove the $CO_2$ without entering the syngas stream. For example, the $CO_2$ passes through walls of the membrane to an enclosed area on the other side of the membrane, while the syngas stream continues through the reactor. The sweep gas enters the enclosed area, passing by the membranes and removing the $CO_2$ that has pass through the walls of the membranes. The sweep gas carries the $CO_2$ out of the reactor through a separate exit (not shown) than the $H_2$ rich stream 42.

Figure 2:
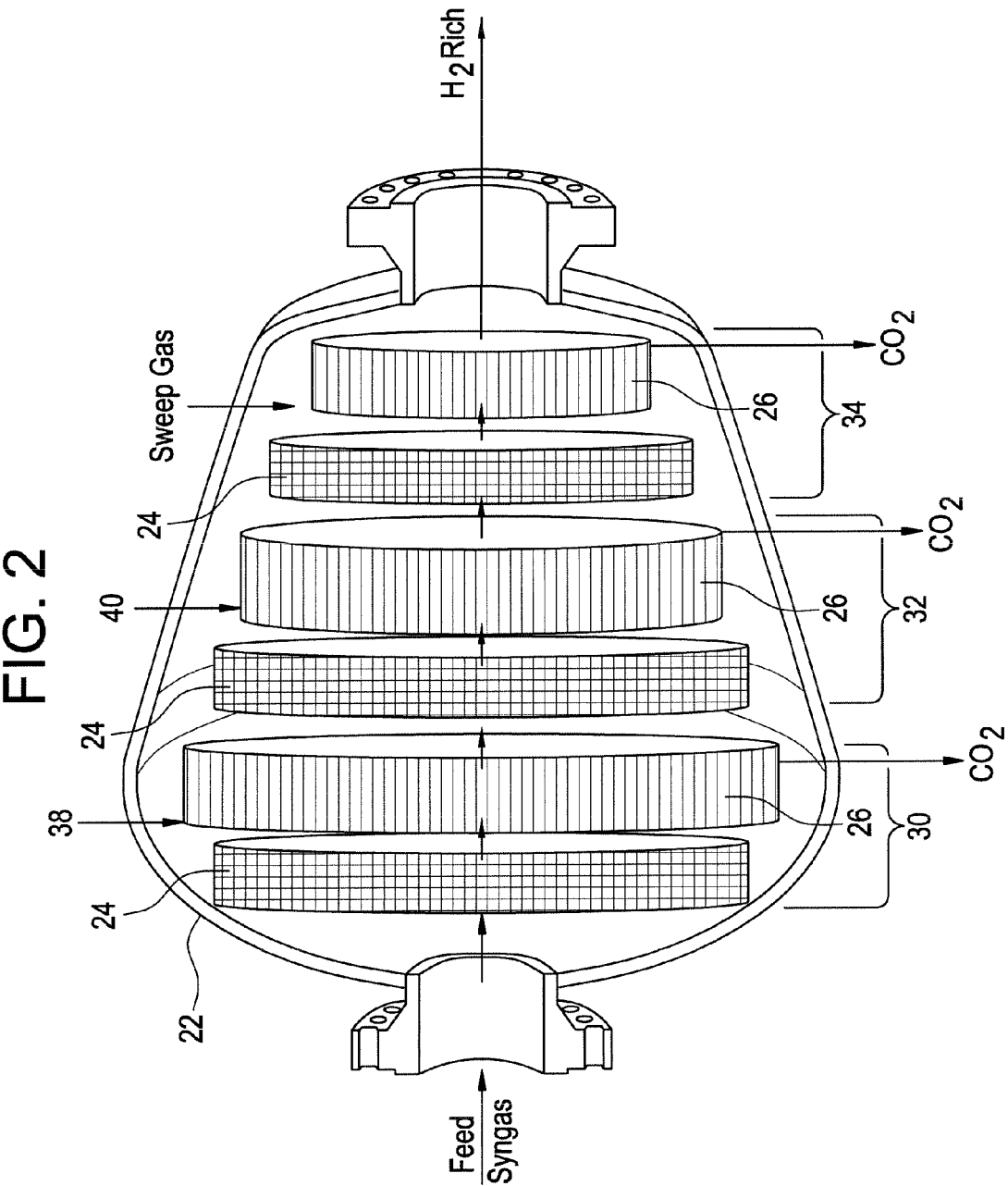
FIG. 2 is a cross-sectional view of an embodiment of an integrated syngas clean-up section, a reactor, comprising multiple conversion-removal portions.

Referring to FIG. 2, another embodiment of an integrated reactor is illustrated. Reactor 22 comprises a first conversion-removal portion 30, a second conversion-removal portion 32, and a third conversion-removal portion 34, all located in a housing 36. Each conversion-removal portion comprises a catalyst section 24 located upstream of a membrane section 26 such that a fluid stream passes through the first catalyst section where carbon monoxide and steam are converted to $H_2$ and $CO_2$, and then the stream passes through the first membrane section where the $CO_2$ is removed from the stream by $CO_2$ selective membranes, whereby the $CO_2$ is removed from the reactor 22 via a sweep gas 38. The now $CO_2$ depleted stream then contacts the second catalyst section where more carbon monoxide and steam present in the stream are converted to additional $H_2$ and additional $CO_2$. The stream then passes through the second membrane section where additional $CO_2$ is removed from the stream via the $CO_2$ selective membranes, and from the reactor via sweep gas 40. The process is again repeated in the third conversion-removal portion and any subsequent conversion removal portion(s).

The catalyst section(s) 24 can comprise the same or different shift reactor catalyst(s) that are configured to convert CO to $CO_2$. Possible catalysts include iron (Fe), a noble metal catalyst(s) such as palladium (Pd), platinum (Pt), rhodium (Rh), as well as combinations comprising at least one of the foregoing catalysts, such as ferro-chromium (Fe—Cr) alloys, platinum-rhenium (Pt—Re) alloys, and so forth. These catalysts can be supported on high surface area ceramics such as cerium oxide ($CeO_2$), zirconium oxide, aluminum oxide ($Al_2O_3$), cordierite, as well as combinations comprising at least one of the foregoing supports. In the exemplary embodiment, the first catalyst section comprises iron, while the third catalyst section comprises palladium.

As syngas 14 travels through catalyst section 24 within housing 36, an exothermic water-gas shift reaction ($CO+H_2O \rightleftharpoons CO_2+H_2$) converts CO to $CO_2$. The catalyst sections and the membrane sections can be disposed in a spaced relation to one another (i.e., not in physical contact with the subsequent or prior portion), e.g., to inhibit thermal transfer between the catalyst section and membrane section, and to enable thermal dissipation. Additionally, the inlet sweep gas passing through the membrane sections can be at lower temperature than the syngas stream (e.g., greater than or equal to about 100° C. lower than the syngas stream temperature) such that the sweep gas removes the $CO_2$ and heat from the reactor. Sufficient cooling can be attained to further enhance WGS reaction driving force for maximum CO conversion without employing a separate heat exchanger, thereby reducing the reactor complexity and cost. Additionally, the $H_2$ stream exiting the reactor can have a higher temperature (e.g., about 250° C. to about 350° C.) than hydrogen streams exiting non-integrated WGS/$CO_2$ separation systems (e.g., about ambient temperature (about 25° C. to about 50° C.). The increased operating temperature of the syngas cleanup and $CO_2$ removal process, and thus the higher temperature of the $H_2$ stream 42 exiting the reactor reduces energy losses associated with cooling and reheating that are typically required for conventional $CO_2$ removal technology, which operates and produces a $H_2$ stream at about room temperature (e.g., about 30° C.).

For example, the first conversion-removal section can have a temperature of about 350° C. to about 450° C., and the sweep gas can cool the syngas stream such that the syngas stream entering the second section has a temperature of about 300° C. The second conversion-removal section can then operate at a temperature of about 300° C. to about 350° C., and the sweep gas can cool the syngas stream such that the syngas stream entering the third section has a temperature of about 250° C. The third conversion-removal section can then operate at a temperature of about 250° C. to about 300° C., and the sweep gas can cool the syngas stream such that the syngas stream exiting the reactor has a temperature of about 250° C.

The membrane sections 26 are $CO_2$ selective and thus continuously remove the $CO_2$ produced in the catalyst sections 24, allowing the equilibrium conversion of CO to $CO_2$ to proceed to nearly complete CO conversion (as low as 10 parts per million by volume (ppm) CO remaining in the $H_2$ product stream). Optionally, if $H_2S$ removal is also desired, the membrane section 26 can also be $H_2S$ selective and thus continuously remove $H_2S$ to facilitate achieving low levels of $H_2S$ (less than or equal to 100 ppm) in the $H_2$ product, and/or a separate $H_2S$ selective membrane section 28 can be employed. It is noted that although the $H_2S$ selective membrane section 28 is illustrated as downstream of the conversion-removal portions 30, 32, $H_2S$ selective membrane section(s) can be located before, between, and/or after conversion-removal portion(s).

The membrane section 26 can comprise any membrane material that is stable at the operating conditions and has the required $CO_2$ (and optionally $H_2S$) permeability and selectivity at the operating conditions. Furthermore, the membrane material can be chosen such that one or more membrane sections 26 comprise a different composition, depending upon the particular membrane section's operating temperature range. For example, the first membrane section can comprise ceramic-based membrane that is operable at a temperature of about 250° C. to about 500° C. (e.g., about 300° C. to about 450° C.), the next (e.g., second) membrane section can comprise the same or a different ceramic-based membrane that is operable at a temperature of about 200° C. to about 400° C. (e.g., about 250° C. to about 350° C.), while the next (e.g., third or last) membrane section can comprise a ceramic-based membrane, polymer-based membrane, or a hybrid membrane that is operable at a temperature of about 50° C. to about 250° C. (e.g., about 50° C. to about 150° C. for ceramic-based membrane, polymer-based membrane, or a hybrid membrane, and ceramic-based membrane for temperatures of about 175° C. to about 250° C.).

Possible membrane materials that are selective for $CO_2$ include certain inorganic and polymer materials, as well as combinations comprising at least one of these materials. Inorganic materials include microporous silica, microporous mixed oxide, and zeolite materials, as well as combinations comprising at least one of these materials. Some possible membrane materials are described in U.S. patent application Ser. No. 11/263,165, to Ruud et al., filed on Oct. 31, 2005.

While not to be limited by a particular theory, mechanisms for $CO_2$ selectivity in microporous materials include surface diffusion and capillary condensation. A material that has an affinity for $CO_2$ relative to other gases in a stream will show a preferred adsorption and surface diffusion of $CO_2$. Furthermore, the presence of the adsorbed $CO_2$ molecules, through capillary condensation, will effectively block the pore from the more weakly adsorbing gases, thereby hindering their transport. The gas selectivity through the membrane is determined by the relative contributions of Knudsen flow and surface diffusion to the total transport of gas. For example, to achieve $CO_2$ selectivity, surface diffusion must make a significant contribution to the total $CO_2$ transport. The rate of surface diffusion depends on the amount of $CO_2$ adsorbed and its relative mobility.

To a first approximation, the surface diffusivity of a gas on a material can be estimated from the heat of adsorption. Since the diffusivity varies exponentially with the negative of the heat of adsorption, materials with lower heats of adsorption exhibit higher surface diffusivity. Physically, this means that materials suitable for functional materials have a greater affinity for $CO_2$ than for other gases in the stream, but the affinity for $CO_2$ is not so great that the $CO_2$ binds to the surface without transporting through the pore channel. Low heats of adsorption correspond to weakly bonded $CO_2$, which favors high diffusivities. Accordingly, materials that are suitable for use as the functional material are characterized by high surface coverage derivative ($d\theta/dp$) and low heat of adsorption ($\Delta H$). These properties may be determined from $CO_2$ adsorption isotherms of the materials and appropriate materials may be chosen. In an exemplary embodiment, the ceramic comprises a material such as $SiO_2$, $BaTiO_3$, $BaZrO_3$, $LaFeO_3$, as well as combinations comprising at least one of these materials. These oxides theoretically show substantially high mobility for surface diffusion of $CO_2$ and hence may provide the required permeability.

Membranes that are selective for $CO_2$ at lower temperatures can include polymeric materials such as polyethers and polyether blends and hybrid membranes such as silanized gamma-alumina membranes. Silanes, such as 2-acetoxyethyl, 2-carbomethoxyethyl and 3-aminopropyl, can be integrated with ceramic membranes to achieve selective $CO_2$ transport.

In practice, the membrane often comprises a separation layer that is disposed upon a support layer. For asymmetric inorganic membranes, the porous support can comprise a material that is different from the separation layer. Support materials for asymmetric inorganic membranes include porous alumina, titania, cordierite, carbon, silica glass (e.g., Vycor®), and metals, as well as combinations comprising at least one of these materials. Porous metal support layers include ferrous materials, nickel materials, and combinations comprising at least one of these materials, such as stainless steel, iron-based alloys, and nickel-based alloys. Polymeric membranes can be disposed on polymeric or inorganic supports.

The membrane materials are generally in the form of tubes that are disposed parallel to one another. The tubes can be arranged to form the entire membrane section or can be arranged to form a group, whereby a plurality of groups can be arranged in a parallel fashion to form the membrane section. In this arrangement, individual group(s) can be removed/replace, while retaining the remaining group(s). Near each of the ends of the membrane section can be boundaries and/or sealings that prevent the sweep gas from mixing with the syngas.

As can be seen in FIGS. 1 and 2, the reactor can comprise alternating catalyst sections and membrane sections. The number of alternating portions is dependent upon the desired efficiency of the reactor, as well as size and cost considerations. Generally, the reactor comprises greater than or equal to 2 conversion-removal portions, or, more specifically, about 3 to about 10, or, even more specifically about 3 to about 6 conversion-removal portions. These conversion-removal portions, and hence each catalyst section and each membrane section, can be different sizes. Desirably, the reactor has a somewhat conical shape such that it has a smaller diameter near the downstream end 44 than near the upstream end 46. The degree of change of the diameter can be based upon the amount of carbon dioxide to be removed from the fluid stream 14. Desirably, the reactor diameter (and hence the internal volume) sufficiently changes from the upstream end to the downstream end to maintain the pressure of the fluid stream to ±10% of the pressure of the fluid stream entering the reactor (e.g., the initial pressure or fluid stream pressure). More specifically, the final pressure (e.g., the pressure of the stream exiting the reactor or $H_2$ stream pressure) can be ±5% of the initial pressure.

As a result of the changing size of the reactor, and the decreasing volume of the fluid stream passing through the reactor, the conversion-removal portions can also comprise a decreased total cross-sectional flow area compared to a subsequent portion disposed upstream thereof. For example, wherein the first catalyst section can have a first catalyst region diameter and a first catalyst region volume that is larger than a second catalyst region diameter and a second catalyst region volume of the second catalyst section. Additionally, the first membrane section can have a first membrane region diameter and a first membrane region volume that is larger than a second membrane region diameter and a second membrane region volume of the second membrane section. The specific size of each portion is dependent upon the volume and flow rate of the fluid stream, the amount of CO to be converted, and the amount of $CO_2$ to be removed.

The bulk of processed syngas 14 exits reactor 20/22 in a fluid stream ($H_2$ rich stream) 44, which is depleted in $CO_2$ and, optionally, $H_2S$. As mentioned, if $H_2S$ removal is desired, it can be removed concurrently with the $CO_2$ (e.g., using membranes selective for both $CO_2$ and $H_2S$), or subsequently and/or previously, e.g., with the $H_2S$ selective membrane 28. Once out of the reactor, the $H_2$ rich stream can be employed as desired. For example, the stream can be stored (e.g., in metal hydride, carbon nanotubes, high pressure tanks, and so forth), and/or employed, e.g., to make electricity. For example, a portion of the $H_2$ rich stream can be used in a combined cycle power generation unit 48 which includes a combustion turbine 50 and a heat recovery steam generator 52 to produce electricity 54.

The following examples are provided to further illustrate an embodiment of the reactor and are not intended to limit the broad scope of this application.

EXAMPLES

Two reactors designs were calculated to determine the effect of a single removal portion (Reactor 1) versus multiple conversion-removal portions (Reactor 2). For each reactor, Reactor 1 and Reactor 2, the membrane permeability for $CO_2$ was 10,000 Barrer, the selectivity of $CO_2$ over $H_2$ was 25, the thickness of the membrane functional layer was 1 micrometer, the internal diameter of each membrane tube was 1 centimeter (cm), each membrane section was divided into 8 parallel trains, and the inlet syngas molar flow rate was 4,000 kilomoles per hour (kmol/hr) with 29 volume percent (vol %) CO, 31 vol % $H_2O$, 12 vol % $CO_2$, and 26 vol % $H_2$, while the syngas stream pressure was 30 bar and temperature was 350° C. The outlet temperature was about 250° C.

Figure 3:
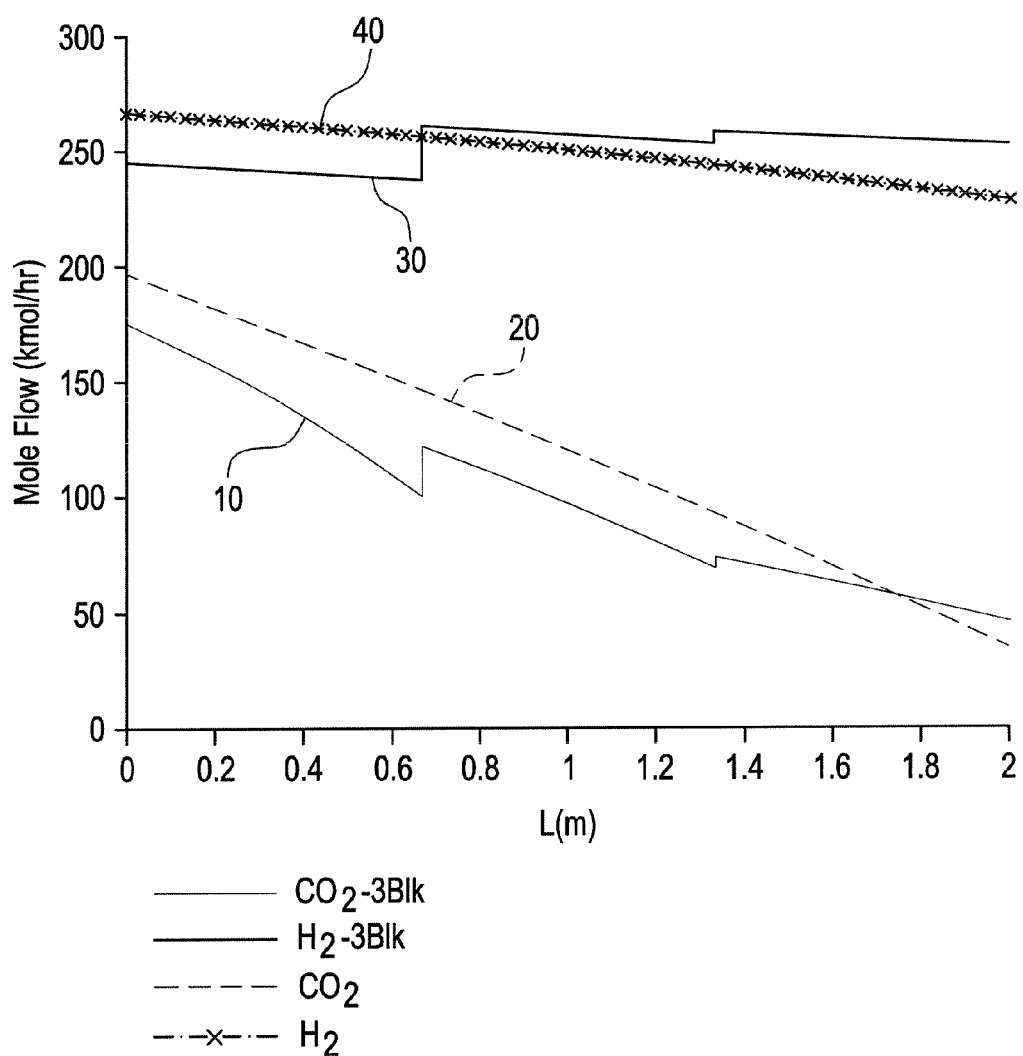
FIG. 3 is a graphical representation of $CO_2$ and $H_2$ concentration through reactors comparing a reactor with multiple conversion-removal portions to a reactor with a single conversion-removal portion.

It is noted that the permeability is the gas flow rate multiplied by the thickness of the material, divided by the area and by the pressure difference across the material. To measure this quantity, the barrer is the permeability represented by a flow rate of $10^{-10}$ cubic centimeters per second (volume at standard temperature and pressure, 0° C. and 1 atmosphere), times 1 centimeter of thickness, per square centimeter of area and centimeter of mercury difference in pressure. The term "membrane selectivity" or "selectivity" is the ratio of the permeabilities of two gases and is a measure of the ability of a membrane to separate the two gases. For example, selectivity of a $CO_2$ selective membrane is the ratio of the permeability of $CO_2$ through the membrane versus that of $H_2$. The membranes desireably have a selectivity of greater than or equal to about 20, or, more specifically, greater than or equal to about 25, or, yet more specifically, greater than or equal to about 40, and even more specifically, greater than or equal to about 60.

membrane tubes was less, and the selectivity, permeability, membrane functional layer thickness, and membrane tube internal diameter were the same, Reactor 2 had reduced hydrogen loss and enhanced CO conversion. Compared to Reactor 1, Reactor 2 reduced hydrogen loss by over 40%. Additionally, CO conversion increased to 99.2%, as compared to 95% for Reactor 1. These advantages are graphically illustrated in FIG. 3 where line 10 represents the amount of $CO_2$ present at different points in the membrane sections in Reactor 2, line 20 represents the amount of $CO_2$ present at different points in the membrane section in Reactor 1, line 20 represents the amount of $H_2$ present at different points in the membrane sections in Reactor 1, and line 40 represents the amount of $CO_2$ present at different points in the membrane sections in Reactor 2.

The above-described reactor system based on high-temperature membrane separation of carbon dioxide from syngas offers many advantages for an integrated coal-to-$H_2$ and electricity polygeneration process. The integrated concept allows for a reduced energy cost for $CO_2$ capture, lower capital cost, and a smaller overall footprint for the reactor and the plant. Furthermore, the integrated approach leverages synergies between water-gas shift reactions and the need for $CO_2$ removal. The use of membranes for $H_2S$ removal eliminates the need for energy-intensive absorption and solvent regeneration. The economic benefits of the module will facilitate commercialization of IGCC electricity generation plants or IGCC polygeneration plants with $CO_2$ separation. The elimination of two processes (solvent regeneration and PSA) and the consolidation of four others (HTS, LTS, $H_2S$ removal, $CO_2$ removal) into an integrated module will significantly reduce capital costs which will have a significant impact on the economic feasibility of coal-based $H_2$ production technologies.

As discussed above, the integrated syngas clean-up reactor has numerous advantages over non-integrated reactors, such as a reduced volume of steam in the stream (thereby reducing the energy consumption required for the steam generation), optional elimination of a heat exchanger in the reactor, improved efficiency (e.g., higher carbon monoxide conversion and lower hydrogen loss), and optionally, maintenance

|  | Reactor 1: Single Conversion-Removal Portion | Reactor 2: Three Conversion-Removal Portions (P1, P2, P3) | | | |
| --- | --- | --- | --- | --- | --- |
|  | R1 overall | P1 Result | P2 Result | P3 Result | R2 overall |
| Equivalent # of tubes (2 m long, 1 cm ID) | 5642 | 1333 | 1067 | 700 | 3100 |
| $H_2$ purity (% dry base) | 82% | 63% | 75% | 82% | 82% |
| $H_2$ purity (% wet base) | 77% | 57% | 72% | 79% | 79% |
| $H_2$ loss (%) | 15% | 3% | 3% | 2% | 8% |
| $CO_2$ capture (%) | 80% | 38% | 42% | 38% | 78% |
| CO conversion (%) | 95% | 80% | 80% | 80% | 99% |
| Reactor length (m) | 2 | 0.67 | 0.67 | 0.67 | 2 |
| Average reactor diameter (m) | 1.24 | 1.04 | 0.93 | 0.76 | 0.91 |
| Outlet Pressure (bar) | ~26 |  |  |  | ~27 |

As can be seen from Table 1, although the reactor length did not change, the reactor diameter was less, the number of of a substantially constant pressure through the reactor. An additional advantage of this reactor is the decoupling of the membrane section(s) and the catalyst sections. This decoupling enables each portion to operate at a more preferable temperature for that portion (e.g., a catalyst and/or membrane keyed to the temperature at that point in the reactor can be employed). For example, specific catalysts can be chosen for each catalyst section (e.g., catalysts that exhibit enhanced performance at the operating temperature of that particular portion), and specific membrane materials can be chosen for each membrane section to also optimize performance and/or to reduce cost. Further advantages of the decoupling include the enablement of individual replacement of a portion if damaged or otherwise malfunctioning, and the broadening of design specifications for each portion.

An exemplary embodiment of an integrated, high temperature syngas clean-up section is described in detail above. The syngas clean-up section is not limited to the specific embodiments described herein, but rather, components of the clean-up section may be utilized independently and separately from other components described herein. Furthermore, the need to remove $CO_2$ is not unique to coal-derived plants, and as such, the integrated syngas clean-up section could be used for alternative fuel or biomass systems to convert low-value syngas to high-purity $H_2$. Therefore, the apparatus and method can be implemented and utilized in connection with many other fuel systems and turbine configurations.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for removing carbon dioxide from a fluid stream, comprising:
    a housing having an inlet near an upstream end and an outlet near a downstream end;
    a first conversion-removal portion located in the housing, near the inlet, and configured to receive a fluid stream from the inlet, wherein the first conversion-removal portion comprises
    a first catalyst section configured to convert CO in the stream to $CO_2$; and
    a first membrane section located downstream of and in flow communication with the first catalyst section, wherein the first membrane section is configured to selectively remove the $CO_2$ from the stream and to be in flow communication with a first sweep gas; and
    a second conversion-removal portion located in the housing and downstream of the first conversion-removal portion, the second conversion-removal portion being configured to receive the stream from the first conversion-removal portion, wherein the second conversion-removal portion comprises
    a second catalyst section configured to convert CO in the stream to $CO_2$; and
    a second membrane section located downstream of and in flow communication with the second catalyst section, wherein the second membrane section is configured to selectively remove the $CO_2$ from the stream and to be in flow communication with a second sweep gas.

2. The apparatus of claim 1, wherein the first catalyst section has a first catalyst region diameter and a first catalyst region volume that is greater than a second catalyst region diameter and a second catalyst region volume of the second catalyst section, and wherein the first membrane section has a first membrane region diameter and a first membrane region volume that is greater than a second membrane region diameter and a second membrane region volume of the second membrane section.

3. The apparatus of claim 1, wherein the first conversion-removal portion has a greater total cross-sectional flow area than the second conversion-removal portion.

4. The apparatus of claim 3, wherein the apparatus is configured such that during use of the apparatus to convert CO to $CO_2$ and remove the $CO_2$ from the stream, an exit stream pressure of a $H_2$ rich stream exiting the housing is within ±10% of a feed stream pressure of the stream entering the housing.

5. The apparatus of claim 3, wherein the apparatus is configured such that greater than or equal to about 98% conversion of CO is attained using an amount of steam that is less than or equal to about 150% of a stoichiometric amount of steam.

6. The apparatus of claim 1, wherein the reactor is free of a heat exchanger.

7. The apparatus of claim 1, wherein the first catalyst section is disposed in a spaced relationship to the first membrane section, the second catalyst section is disposed in a spaced relationship to the second membrane section, and the first conversion-removal portion is disposed in a spaced relationship to the second conversion-removal portion.

8. The apparatus of claim 1, wherein the first membrane section is capable of operating at a different temperature than the second membrane section, and wherein at that different temperature, the first membrane section has a selectivity of $CO_2$ over $H_2$ of greater than or equal to about 25.

9. The apparatus of claim 1, wherein the first catalyst section comprises a first catalyst comprising iron, wherein the second catalyst section comprises a second catalyst that is selected from the group consisting of palladium, platinum, rhodium, and combinations comprising at least one of the foregoing second catalysts; and wherein the first catalyst is different from the second catalyst.

10. The apparatus of claim 9, wherein the second catalyst comprises platinum.

11. The apparatus of claim 1, further comprising a third conversion-removal portion located in the housing and downstream of the second conversion-removal portion, the third conversion-removal portion being configured to receive the stream from the second conversion-removal portion, wherein the third conversion-removal portion comprises a third catalyst section configured to convert CO in the stream to $CO_2$; and a third membrane section located downstream of and in flow communication with the third catalyst section, wherein the third membrane section is configured to selectively remove the $CO_2$ from the stream and to be in flow communication with a third sweep gas.

12. The apparatus of claim 1, comprising a total of 3 to 10 conversion-removal portions.

13. The apparatus of claim 1, wherein the first membrane section and/or the second membrane section are further configured to selectively remove $H_2S$ from the stream.

14. The apparatus of claim 1, wherein the first membrane section and/or the second membrane section comprises a plurality of membrane blocks, wherein each membrane block comprises a plurality of membrane tubes, and wherein each membrane block is located in a parallel flow relation to the other membrane blocks.

15. An apparatus for removing carbon dioxide from a fluid stream, comprising:

a housing having an inlet near an upstream end and an outlet near a downstream end;

a first conversion-removal portion located in the housing, near the inlet, and configured to receive a fluid stream from the inlet, wherein the first conversion-removal portion comprises a first catalyst section configured to convert CO in the stream to $CO_2$; and a first membrane section located downstream of and in flow communication with the first catalyst section, wherein the first membrane section is configured to selectively remove the $CO_2$ from the stream and to be in flow communication with a first sweep gas;

a second conversion-removal portion located in the housing and downstream of the first conversion-removal portion, the second conversion-removal portion being configured to receive the stream from the first conversion-removal portion, wherein the second conversion-removal portion comprises a second catalyst section configured to convert CO in the stream to $CO_2$; and a second membrane section located downstream of and in flow communication with the second catalyst section, wherein the second membrane section is configured to selectively remove the $CO_2$ from the stream and to be in flow communication with a second sweep gas; and a third conversion-removal portion located in the housing and downstream of the second conversion-removal portion, the third conversion-removal portion being configured to receive the stream from the second conversion-removal portion, wherein the third conversion-removal portion comprises a third catalyst section configured to convert CO in the stream to $CO_2$; and a third membrane section located downstream of and in flow communication with the third catalyst section, wherein the third membrane section is configured to selectively remove the $CO_2$ from the stream and to be in flow communication with a third sweep gas;

wherein the housing has a decreasing diameter such that a first diameter at the first conversion-removal portion is greater than a third diameter near the third conversion-removal portion.

* * * * *

UNITED STATES PATENT AND TRADEMARK OFFICE
CERTIFICATE OF CORRECTION

PATENT NO.        : 7,648,566 B2                                               Page 1 of 1
APPLICATION NO.   : 11/558063
DATED             : January 19, 2010
INVENTOR(S)       : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Twenty-eighth Day of December, 2010

David J. Kappos
*Director of the United States Patent and Trademark Office*